United States Patent [19]

Ghose et al.

[11] Patent Number: 5,051,855
[45] Date of Patent: Sep. 24, 1991

[54] ROTARY ACTUATOR

[75] Inventors: Sanjoy Ghose, Santa Cruz County; Enrique J. Klein; Efim Bronshvatch, both of Santa Clara County; Bernhard M. Seeger, Santa Cruz County; Donald J. Macleod, Santa Cruz County; Gunter K. Heine, Santa Cruz County; Oswald Kuwert, Santa Cruz County; Ramgopal Battu, Los Angeles County, all of Calif.

[73] Assignee: Seagate Technology, Inc., Scotts Valley, Calif.

[21] Appl. No.: 474,222

[22] Filed: Feb. 2, 1990

Related U.S. Application Data

[63] Continuation of Ser. No. 263,997, Oct. 25, 1988, abandoned, which is a continuation of Ser. No. 115,691, Nov. 2, 1987, Pat. No. 4,881,140, which is a continuation of Ser. No. 914,690, Oct. 2, 1986, abandoned.

[51] Int. Cl.$^5$ .............................................. G11B 5/55
[52] U.S. Cl. .................................................... 360/106
[58] Field of Search ............ 360/104, 105, 106, 97.01, 360/99.1

[56] References Cited

U.S. PATENT DOCUMENTS

| | | | |
|---|---|---|---|
| 4,110,802 | 8/1978 | Ho et al. ............................ | 360/106 |
| 4,395,742 | 7/1983 | Ostroff ................................ | 360/78 |
| 4,556,924 | 12/1985 | Quist, Jr. et al. .................. | 360/106 |
| 4,631,611 | 12/1986 | Schneider .......................... | 360/106 |
| 4,745,504 | 5/1988 | Foote ................................. | 360/106 |

FOREIGN PATENT DOCUMENTS

| | | | |
|---|---|---|---|
| 3404231 | 8/1985 | Fed. Rep. of Germany ...... | 360/106 |
| 0124066 | 7/1964 | Japan .................................. | 360/104 |

Primary Examiner—David J. Severin
Attorney, Agent, or Firm—Flehr, Hohbach, Test, Albritton & Herbert

[57] ABSTRACT

In a disc drive with an integrated casting comprising the housing for the stepper and spindle motors, the transducer is mounted on a normal bearing pivot assembly lightweight actuator arm and biasing strip spring. One end of the strip spring is mounted to a block and the effective force of the spring is aligned with the actuator arm running toward the stepper motor. The other, or head end of the actuator arm contains a gear sector having gear teeth on its face which mesh with a pinion on a motor shaft so rotation of the motor shaft across the face of the gear sector causes movement of the head mounting arm. The actuator arm is formed of a self-lubricating polymer or other lightweight self-lubricating material. This way, wear on the gear is reduced; and as the teeth are worn, the gear is still tightly biased against the pinion to maintain accurate movement of the actuator arm with rotation of the pinion.

8 Claims, 4 Drawing Sheets

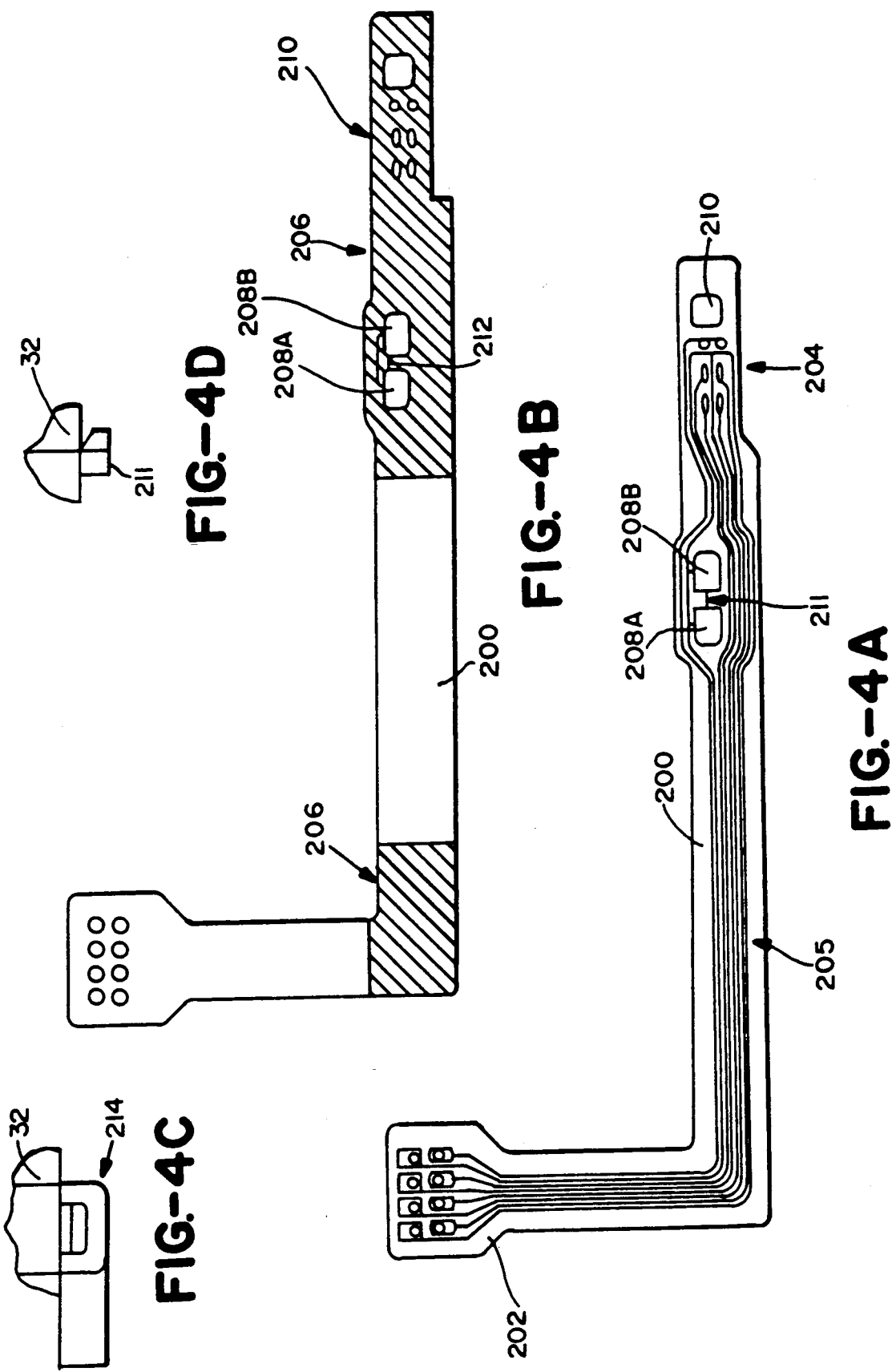

ROTARY ACTUATOR

This is a continuation of application Ser. No. 263,997 filed on Oct. 25, 1988 now abandoned which is a continuation application of Ser. No. 115,691, now U.S. Pat. No. 4,881,140 filed Nov. 2, 1987, which is a continuation application of Ser. No. 914,690 filed Oct. 2, 1986, now abandoned.

BACKGROUND OF THE INVENTION

This invention is directed generally to the field of disc drives incorporating rotary actuators, and more particularly to an improved pivot mechanism for the actuator.

Disc drive machines record and reproduce information stored on concentric circular tracks on magnetic discs. Tracks are written and read by magnetic heads which must be accurately positioned over one of the tracks on the surface of the disc. Various methods have been used to position the heads. The two common types of head positioning mechanisms are linear and rotary head actuators.

One objective herein is to provide an improved disc drive rotary actuator. The common form of rotary actuator includes a head arm, flexure, read/write head and head arm extending out from a pivot. Extending from the pivot to essentially form a "V" shaped arm assembly is an actuator arm which in turn is coupled to a stepper motor. One common feature of known rotary actuator mechanism is the requirement of a high accuracy pivot mechanism at this juncture between the actuator arm and head arm.

SUMMARY OF THE INVENTION

It is an objective of the present invention to provide an improved pivot mechanism for use in a rotary actuator.

Due to read/write head positioning requirements, the pivot mechanism must offer high precision reliability, and low mechanical resistance. It is an objective of the present invention to meet these design requirements in a pivot mechanism which is easily constructed.

The pivot mechanism in the prior art generally consists of a shaft supporting the juncture of the two arms, i.e., actuator drive arm and head arm, two preloaded high class ball bearings, spring retainers, preload springs, plus attachment means to the base casting and the arm or arms.

It is an objective herein to provide a significantly improved pivot mechanism in terms of simplicity of design and ease of assembly as well as having a significantly reduced parts count. It is a further objective of the present invention to provide a simple and highly reliable pivot mechanism which still offers the required precision and reliability of other, more complex pivot mechanisms.

Another integral portion of any pivot mechanism is coupling between stepper motor shaft and drive arm. Typically, the motor shaft is located perpendicular to the actuator arm and coupled thereto through bands which wind and unwind on the pulley with rotation of the shaft, thereby moving the actuator arm back and forth.

A further objective of this invention is to eliminate the drive bands that are used coupled stepper motor to actuator arm to control track accessing. Prior efforts have been made in this direction by providing a frictional coupling between a sector at the end of the actuator arm and the motor shaft. However, such a connection is clearly subject to misalignment in the event of shock, and accurate realignment can be quite difficult. Also, the frictional coupling effect can diminish with time.

An objective of this invention is to provide a coupling between actuator arm and motor shaft pulley which relies on neither belts nor friction.

The above and other objectives of this invention are achieved by replacing the normal bearing pivot assembly with a combination of a lightweight actuator arm and biasing strip spring. One end of the strip spring is mounted to a block and the tensile force of the spring is aligned with the actuator arm running toward the stepper motor. The other, or head end of the actuator arm contains a gear sector having gear teeth on its face which mesh with pinions machined onto a motor shaft so rotation of the motor shaft across the face of the gear sector causes movement of the head mounting arm.

In this way, the normal bearing pivot assembly is eliminated. A low cost, easily assembled disc drive assembly is provided utilizing a minimum number of parts. Minimal off-tracking occurs with shock because of the existing spring forces on the actuator arm. Further, tooth wear of the gear sector or pinion will cause minimal off-track radially since the wear causes tangential motion of the head on the track. Also, the spring force keeps the gear sectors pressed tightly against the pinions on the spring drive shaft so that contact does not diminish with time. These spring means are further provided to substantially maintain the gear sectors and pinion in contact, even in the event of operating shock.

In an especially useful embodiment of this invention, the actuator arm is formed of a self-lubricating polymer or other lightweight self-lubricating material. This way, wear on the gear is reduced; and as the teeth are worn, the gear is still tightly biased against the pinion to maintain accurate movement of the actuator arm with rotation of the pinion.

BRIEF DESCRIPTION OF THE DRAWINGS

The features and advantages of this invention will be better understood with reference to the following figures:

FIG. 4 is a plan view of the disc drive housing of this invention.

FIG. 5 is a sectional view of the mounting of the stepper motor and spindle motor of this invention.

FIGS. 6A, 6B and 6C are views of the disc mounting rings used to mount a disc on the spindle motor hub.

DETAILED DESCRIPTION OF A PREFERRED EMBODIMENT

Figure 1:
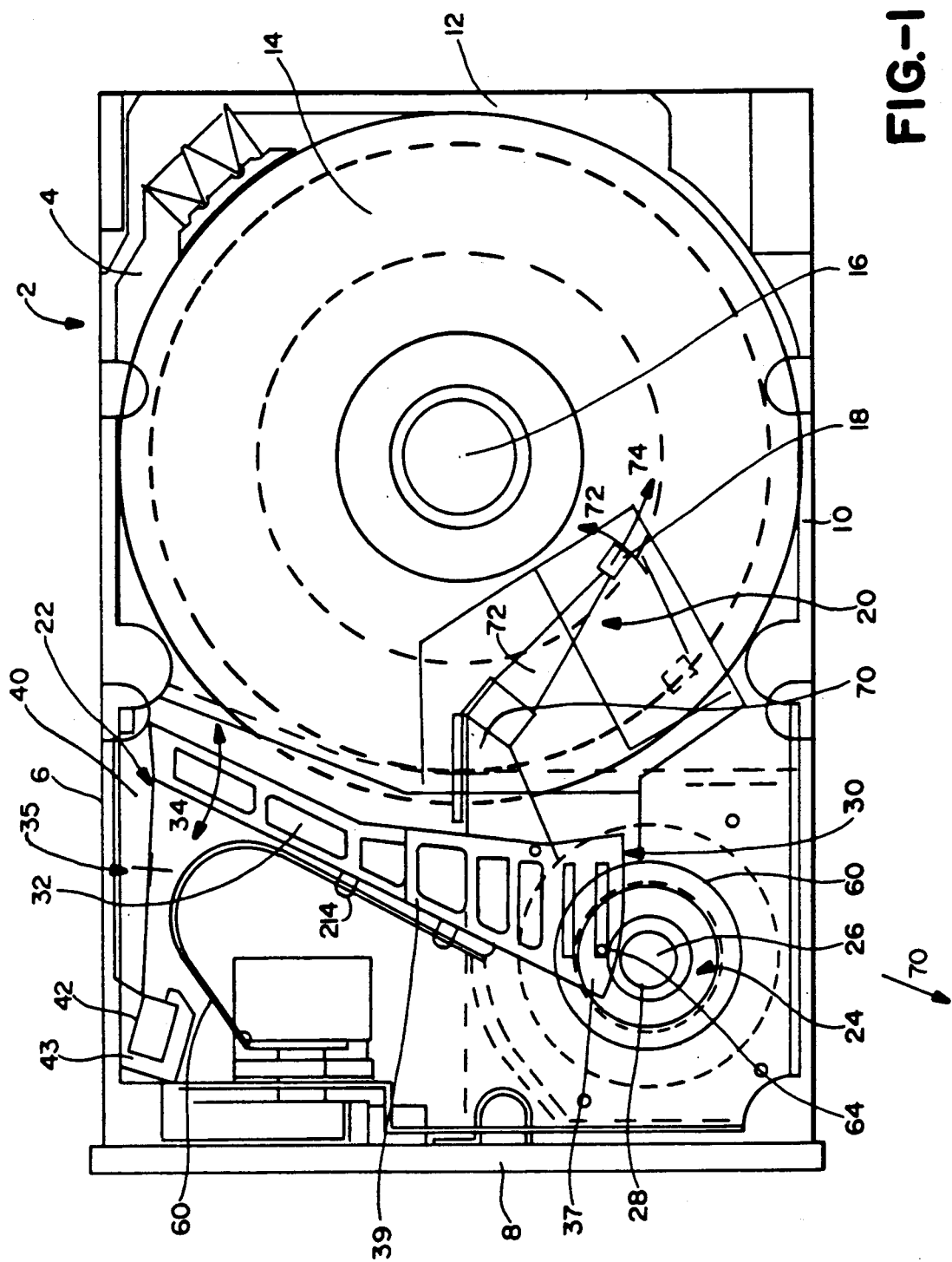
FIG. 1 is a top plan view of the major elements of the disc drive designed in accordance with this invention.

In all the figures, like components are designated by like reference numerals. Referring to FIG. 1, the major elements of a disc drive are shown including a housing 2 including a baseplate 4 and upright walls 6, 8, 10 and 12. The integral casting for the base of this disc drive is disclosed in greater detail below, as shown in FIG. 4.

A data storage disc 14 is mounted within the housing for rotation about a spindle 16, and a transducer 18 is provided for reading and writing data on the disc. The transducer 18 is positioned using a head actuator arm assembly combination generally indicated at 20.

The arm assembly 20 pivots around a biasing mounting spring 22 which will be described in detail below in response to rotation of a stepper motor 24 which is mounted beneath the baseplate 4 with its shaft 26 extending up through the baseplate. The motor shaft 26 has pinions 28 machined thereon to mesh with gear teeth 30 on the end of actuator arm 32. Therefore, it is clear that rotation of the motor 28 across the face of the gear sector 30 causes movement of the arm assembly 20 generally along the arc defined by arrow 34. As the actuator arm 32 moves, it pivots about a theoretical pivot point 35 to move the transducer head 18 from track to track. Signals are carried to and from the transducer over cable 31 which is mounted on the side of arm 20.

The essential elements of the supporting assembly 22 are seen in FIG. 1 and comprise a flexed metal strip 40 mounted on a support block 42 which in turn is inserted into a mounting block 43 on the side wall 6 of the housing. The mounting block 43 could as easily be mounted on the base casting 4; this mounting is shown in detail in FIGS. 2-3.

The strip 40 of flexible material capable of exerting a strong force along the length of the arm 32. The direction of the spring force is essentially along a line that would pass through the center line of the gear sector 30 and through the motor shaft 26; obviously, with rotation of the motor and movement of the actuator arm, some deflection of the spring occurs, but some spring force is always exerted along this initial path to maintain the gear sector teeth on face 30 constantly in tight coupling arrangement with the pinion 28 so that even with wear or shock, a tight connection continues to exist.

The flexible strip 40 thereby provides a horizontally mounted, bearingless pivot for the actuator arm 32, to cause rotation of the actuator head portion 37 about the phantom pivot point 35. The length of the strip spring 40 is chosen so that the phantom pivot point 35 is about equidistant between the mounting block 43 and the end of the actuator arm 32 to which the strip is fastened. It can be seen that the major portion 39 (i.e. from spring support to the head portion 37) of the actuator arm has a shape that roughly parallels the edge of the disc; the head portion 37 of the arm is set at an angle to the major portion so that the teeth 30 are carried on an arc having the center of rotation 35 as its center.

In a further feature of this invention, means are provided for preventing undue operating shock from causing misalignment in a direction perpendicular to the contact between the pinion 28 and gear sectors 30. To accomplish this, a groove 60 is formed in the top of the armature head 37. A pin 64 is formed in the bottom of the overhanging portion 65 (FIG. 4A) of the motor support. The groove 60 describes the arc followed by the gear sector 30 with rotation of the motor drive shaft so that in the event of a shock to the disc drive, contact between the gear sectors 30 and pinion 28 cannot be lost. Further, it should be noted that the drive is designed so that tooth wear of the gear sector or pinion causes a minimal amount of radial mistracking (see arrow 73) since wear causes tangential motion as indicated by arrow 74 of the head on the track.

Figure 2:
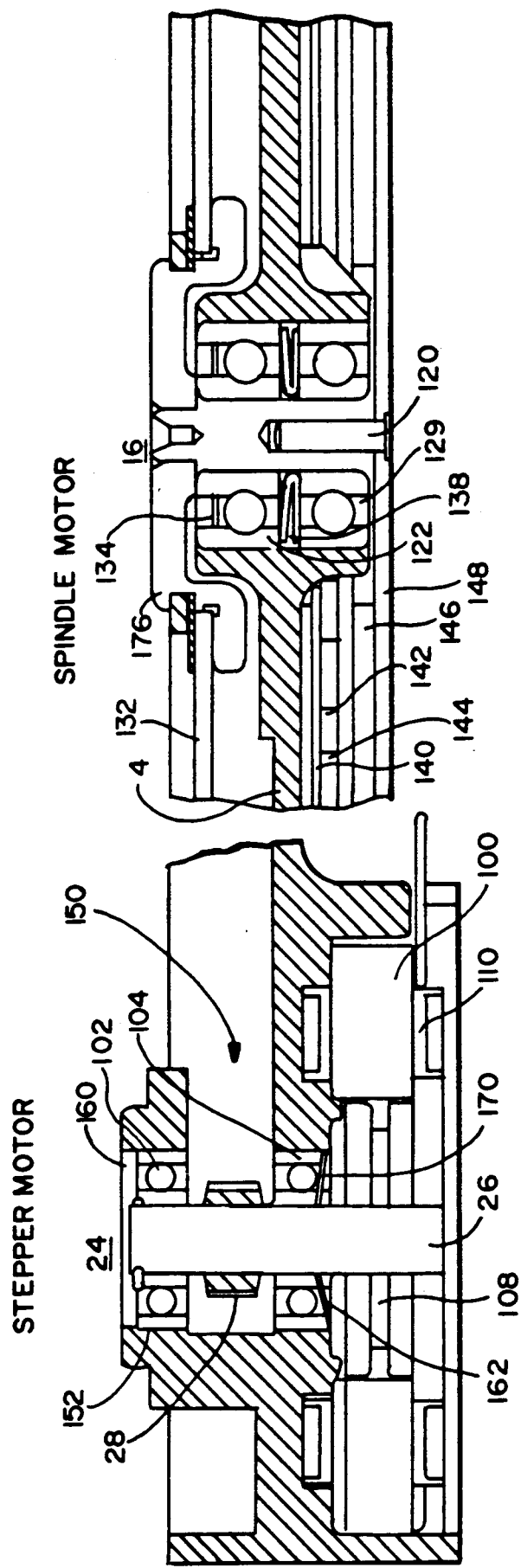
FIGS. 2 and 3 are expanded, detailed views of the mounting block used to mount the biasing strip spring of this invention.
Figure 3:
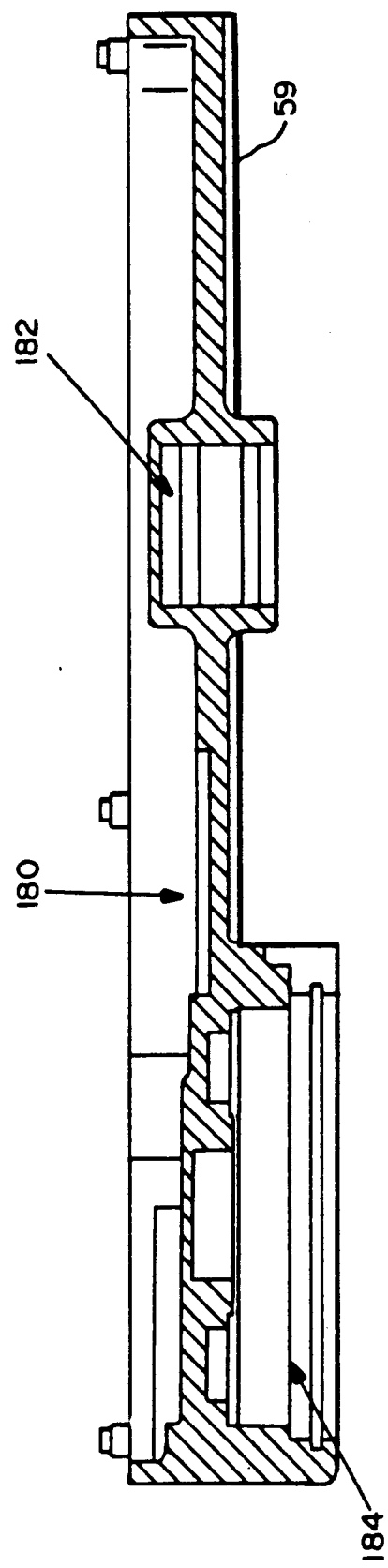

The mounting of the strip spring 40 is a matter of considerable importance, and is shown in detail in FIGS. 2 and 3. FIG. 2 is an exaggerated top view showing the support block 42 inserted into the mounting block 43. FIG. 3 is a sectional view along the line A—A of FIG. 2, and shows the tapering of the block 42 which is matched by the tapered inner surface of the mounting block 43. The flexed metal strip 40 is captured between the support block 42 and mounting block 43. By utilizing this design, the required height and angle of the mounting of the actuator arm 32 can be consistently and reliably established, even though it is supported at the end of the strip 40 only by the supported mounting blocks 42, 43, with the head 37 being pressed by the spring effect of the flexed metal strip against the shaft 28.

The actuator arm itself, including its entire length from the flexed metal strip 40 up to and including the teeth 30 at the end of the end portion 37, as well as the support arm 70 for the flexure 72 are made of a molded material which in a preferred embodiment comprises a polycarbonate having 30% carbon fiber, and 15% TFE lubricant. The polycarbonate is, of course, light in weight, and therefore supportable by the steel strip; the use of a self-lubricating material insures a lubricated interface between the teeth 30 on the actuator head and the teeth on the drive shaft 28.

The use of a polymer containing lubricating additives to form the actuator arm and flexure support portion of the arm provides a very lightweight arm which can be biased tightly against the gears machined on the shaft. The incorporation of lubricating additives into the polymer will lengthen the life of the arm.

FIG. 4 is a top plan view of the casting which supports the disc drive of this invention. FIG. 5 is a sectional view of the casting in FIG. 4, the section being taken through the spindle motor 16 and the stepper motor 24 to show the unique configuration of these two motors. The unitary configuration of the casting of FIG. 4 has been adopted to provide good registration of the motors one relative to the other, to optimize the accuracy of positioning of the transducer relative to the disc without an unnecessary investment of time in alignment procedures during assembly, as well as to reduce the assembly costs of the entire disc drive system. The disc drive housing and motors of this invention are specifically designed to minimize the height of the disc drive, an important consideration, especially in use in portable personal computers and similar systems. Therefore, the design of both the spindle motor and stepper motor have been modified and specially adopted to integrate their design into the drive base casting, maximize the ease of assembly of each of the motors, and optimize the alignment of the motors and especially their vertical drive shafts.

Looking first at the stepper motor, it can be seen that the stator stack is located below the both the upper bearings 102 and lower bearings 104. As a result, the pinion 28 carried on the end of the drive shaft 26 of this stepper motor 24 is located between the two sets of bearings 102, 104. This provides a very high level of accuracy in the alignment of this shaft, which is necessary and desirable in a stepper motor such as this type, which is being used to drive an actuator arm. The stator stack 100 is located below and outside the drive shaft, with the rotor 108 being attached to the shaft 26 and located inside the stator stack 100. The windings which are also otherwise of conventional design, are located below the stator stack 100.

The spindle motor 16 is also of an extremely low profile, with the major elements including the bearing supporting the shaft being incorporated directly into the integral base casting. The shaft 120 of the spindle motor rotates inside the bearings 122, 124, 126 and 128, which hold the shaft into the integral single piece casting 4. The hub which supports the discs 132 is pressed onto the top of the spindle, and seals 134, 136 are located between the bearing and hub. Alignment of the bearings is maintained with springs 138, 140 which are of a design to produce a force factor generally upward and in toward the shaft so that alignment of the shaft within the casting is maintained. The motor electronics comprise a steel base 140 mounted on the bottom of the main drive casting 4 supporting a plurality of coils generally indicated at 142 and hall effect devices 144 which effectively provide a commutation function. An axially polarized magnet 146 carried on rotor 148 and coupled directly to the shaft 10 and 120, responds to energization of the coils to cause the necessary rotation of the shaft and supported discs 132. It should be noted that the steel plate 140 is fabricated by a powdered metal process using a silicon iron or steel material instead of a stamped sheet metal process. Powdered iron, while still retaining good magnetic properties, has a much higher resistivity than sheet steel and therefore, any currents induced in the plate would be substantially smaller. Thus, the high speed performance of the motor would be much improved. The coils 142 are mounted on a printed circuit board which is printed directly on the base 140. In addition to the coils, the necessary hall effect devices 144 for winding commutation and drive circuits are mounted directly on the printed circuit board.

Returning to the stepper motor, it can be seen that the rack 30 will fit into the slot 150 defined by a hood portion 152 of the main casting and a lower body portion 154. In this way, the pinion 28 is exposed to make contact with the rack, and is maintained in the ideal desired vertical alignment by the upper bearings 102 and lower bearings 104. The top surface 152 has a hole 160 machined through; the bottom surface of the casting 154 has a hole 162 machined in and the bearings are then pressed into place between the shaft and the casting. It is especially significant to note that by putting the bearings on either side of the pinion, and the stator stack below the lower bearing, only a single machined piece is necessary where ordinarily, two machined end bells are necessary to hold the motor assembly together. Alignment of the shaft between the bearings is also supported by the preload spring 170 which constitutes a circular spring surrounding the shaft below the lower bearing. The direction of force of the shaft is upward and toward the center of the shaft, so that alignment of the pinion relative to the rack is maintained by the biasing effect of the spring. The effective center of the forces is at a point above the top end of the shaft, so that the centering effect of the spring on the shaft is effectively through the pinion toward the top of the casting housing.

Returning for the moment to the spindle motor, the means by which the disc 132 is held on the hub 176 also represents a significant improvement in ease of assembly. As can be seen, the disc rests in a notched portion of the hub. A ring 178, which has an inner opening large enough to fit over the top of the hub is dropped on top of the disc. Finally, a C clamp 180 which fits within the notch 182 is pressed in place over the clamp 178 and disc 132. It is important to note that the upper surface 181 of the notch 180 is beveled, so that the C ring slides down and fits tightly against the top of the spacer 178 and disc 132. In this way, the disc is consistently held tightly in place so that it rotates smoothly and consistently with the hub. Moreover, the assembly of the disc on the hub, which is critical to accurate alignment with the transducer head and is normally a time-producing process, is hereby greatly simplified and expedited.

What is claimed is:

1. A disc drive comprising a housing for supporting and enclosing the elements of the disc drive including
    a disc which rotates about a fixed axis and carries a multiplicity of concentric data tracks,
    a spindle motor supported by said housing whose output shaft supports said disc for rotation,
    a transducer which moves generally along one radius of said disc to access data on one of said tracks,
    an arm assembly supporting said transducer for movement over said tracks, such assembly including an actuator arm, said transducer being affixed to one end of a support arm which is attached to the side of said actuator arm, and at least approximately perpendicular to the elongate direction of said actuator arm, said arm assembly being moveable for positioning the transducer and support arm,
    a leaf spring having a first and second ends, a first end being supported on said housing, an end of said actuator arm being attached and supported by said second end of said spring, and
    motor means mounted in the housing and coupled to a driven end of said actuator arm distal from said attachment point between the leaf spring and said actuator arm for positioning the transducer selectively over tracks on the disc, the spring force of said leaf spring extending along said actuator arm to maintain coupling between said actuator arm and said motor means.

2. A disc drive as in claim 1 wherein said first end of said leaf spring is inserted into a mounting block on a side wall of said housing.

3. A disc drive as in claim 2 wherein said distal portion of said actuator arm includes teeth which mate with gear sectors carried on the face of said motor shaft, engagement between said teeth and said sectors being maintained by the force exerted by said leaf spring.

4. A disc drive as claimed in claim 2 wherein the leaf spring has a length and shape selected so that a phantom pivot point is defined midway between said attachment point and said housing support point.

5. A disc drive as in claim 1 wherein said motor means for positioning the arm assembly comprises a stepper motor supported by said housing with a shaft extending up through said housing to contact said distal end of said actuator arm.

6. A disc drive as in claim 5 wherein said stepper motor and said spindle motor are each supported in a housing, said disc drive housing including a base casting having said stepper motor and spindle motor housings as an integral part thereof.

7. A disc drive as in claim 6 wherein said actuator arm of said arm assembly from said end supported by the leaf spring to said driven end is made of a molded material comprising carbon filter.

8. A disc drive as in claim 7 wherein said actuator arm material comprises a lubricant whereby the arm interface between the actuator arm and the stepper motor shaft is lubricated.

* * * * *